United States Patent
Ghosh et al.

[11] Patent Number: 5,958,311
[45] Date of Patent: Sep. 28, 1999

[54] METHOD OF MANUFACTURING A CERAMIC ARTICLE

[75] Inventors: Syamal K. Ghosh; Dilip K. Chatterjee; Debasis Majumdar, all of Rochester, N.Y.

[73] Assignee: Eastman Kodak Company, Rochester, N.Y.

[21] Appl. No.: 09/020,727

[22] Filed: Feb. 9, 1998

[51] Int. Cl.[6] ................................................. C04B 35/48
[52] U.S. Cl. ............................ 264/13; 264/638; 264/645; 264/670; 264/669
[58] Field of Search .................................. 264/669, 670, 264/13, 638, 645

[56] References Cited

U.S. PATENT DOCUMENTS

| | | | |
|---|---|---|---|
| 5,336,282 | 8/1994 | Ghosh et al. | 51/309 |
| 5,552,469 | 9/1996 | Beall et al. | 524/445 |
| 5,554,670 | 9/1996 | Giannelis et al. | 523/209 |
| 5,672,302 | 9/1997 | Chatterjee et al. | 264/332 |
| 5,723,393 | 3/1998 | Majumdar et al. | 501/104 |
| 5,726,110 | 3/1998 | Majumdar et al. | 501/104 |
| 5,730,929 | 3/1998 | Majumdar et al. | 264/669 |
| 5,776,408 | 7/1998 | Ghosh et al. | 264/670 |
| 5,798,308 | 8/1998 | Chatterjee et al. | 501/103 |

OTHER PUBLICATIONS

Advances In Ceramics, vol. 24A: Science and Technology of Zirconia III, "High–Temperature Hot Isostatic Pressing of Y–TZP", C.L. Hogg and M.V. Swain, 1988, pp. 253–266.

Journal of the American Ceramic Society, vol. 66, No. 6, "Processing–Related Fracture Origins: III, Differential Sintering of $ZrO_2$ Agglomerates in $Al_2O_3/ZrO_2$ Composite", F.F. Lange, B.I. Davis, and I.A. Aksay, pp. 407–408.

Communications of the American Ceramic Society, Oct. 1983, "Uniformity of $Al_2O_3/ZrO_2$ Composites by Colloidal Filtration", I.A. Aksay, F.F. Lange, and B.I. Davis, pp. C190–C192.

Journal of the American Ceramic Society, vol. 66, No. 6, "Processing–Related Fracture Origins: I, observations in Sintered and Isostatically Hot–Pressed $Al_2O_3/ZrO_2$ Composites", F. F. Lange, pp. 396–398.

Chem. Mater., vol. 7, No. 11, 1995, Tie Lan et al, "Mechanism of Clay Tactoid Exfoliation in Epoxy–Clay Nanocomposites", pp. 2144–2150.

Primary Examiner—James Derrington
Attorney, Agent, or Firm—Carl F. Ruoff

[57] ABSTRACT

The present invention is a method of producing a ceramic article. The method includes forming an intercalated or exfoliated solution of smectite clay and a polymer selected from polyvinyl alcohols, polyethylene oxides, polystyrene sulfonates, polyacrylamides, polymers of styrene, alkyl acrylates, alkyl methacrylates, olefins, acrylonitriles, polyurethanes and polyester ionomers. The solution is mixed with zirconia stabilized with at least one rare earth oxide element selected from Mg, Ca, Y, Sc and Ce to form a mixture. The mixture is molded into a green part. The green part is sintered to form the ceramic article.

8 Claims, 2 Drawing Sheets

METHOD OF MANUFACTURING A CERAMIC ARTICLE

CROSS REFERENCE TO RELATED APPLICATIONS

This application relates to commonly assigned copending application Ser. No. 09/020,993, filed simultaneously herewith and hereby incorporated by reference for all that it discloses.

FIELD OF THE INVENTION

The present invention relates to a ceramic article and a method for preparing a novel ceramic article. The ceramic article is a continuous tetragonal crystalline phase of zirconia having dispersed therein a monoclinic phase of zirconia with a size of less than 100 nm.

BACKGROUND OF THE INVENTION

The present invention pertains to ceramic items and methods for preparing ceramic items and more particularly pertains to ceramic articles, tools, and methods for preparing ceramic articles and for sintering. Zirconia ($ZrO_2$) is a ceramic material which, in its tetragonal crystal structure, is strong and tough but has the shortcoming that it is relatively soft. Zirconia can also exist in the cubic and monoclinic crystallographic structures, both of which are harder but more brittle than the tetragonal structure. Cubic phase zirconia requires high temperatures for its formation. Monoclinic zirconia, on the other hand, is unsuitable for common fabrication processes because of the enormous thermal stress generated during sintering which causes crumbling of the ceramic. For a number of applications, such as cutting tools, it is desired that the tool materials possess both hardness and toughness.

One of the ways of improving the mechanical properties of crystalline materials is dispersion hardening where distinct second phases are dispersed in a base matrix. To be effective, these second phases should be harder and stronger than the matrix, adding strength through both their reinforcing action and by the additional barriers presented to crack propagation. Such a composite material can provide the optimum combination of strength and toughness desirable for engineering applications. However, the choice of the second phase material, its size in the dispersed phase and the uniformity of the dispersion in the base matrix are crucial to the performance of the composite material.

The hard second phase material should be so chosen that there is compatibility between the dispersed phase and the base matrix. Materials which can chemically interact with the base matrix may result in an undesirable reaction product deteriorating the properties of the composite. Mismatch of thermal expansion coefficient between the dispersed phase and the base matrix may generate stresses around the dispersed phase promoting intergranular fracture and thus lowering the toughness of the composite, as observed by Hogg and Swain (C. L. Hogg and M. V. Swain in Advances in Ceramic, vol. 24A, Science and Technology of Zirconia III, eds. S. Somiya, N. Yamamoto, H. Yanagida, The American Ceramic Society, Ohio, p. 253, 1988). The size and the interparticle spacing of the dispersed phase also play a major role in controlling the final microstructure of the composite. The dispersed second phase can act to pin the grain boundary and prevent excessive grain growth of the base matrix. Accordingly, finer or smaller sized dispersions are expected to be better in checking grain growth at high temperatures, usually needed for obtaining high density composites. For zirconia based systems this is an important issue since tetragonal-to-monoclinic phase transformation in zirconia is strongly dependent on the grain size. Thus the size and the interparticle spacing of the dispersed phase in zirconia systems can have a large effect on the mechanical properties of the composite as well as on the processing conditions such as sintering temperature.

For zirconia based systems, addition of alumina is often practiced for improving mechanical properties. Conventionally this is achieved by mixing of the oxides in dry form prior to compaction. The requirements of this process are: (1) the powder must be deflocculated through mutual dispersion of the different oxides to achieve optimum powder packing; (2) the two dissimilar oxides should be distributed in such a way as to have individual alumina particles as neighbors of zirconia particles to prevent excessive grain growth during sintering of the zirconia particles resulting in inferior mechanical properties. Obviously, it is very difficult to achieve uniform dispersion on a large scale even with efficient mixing equipment. Lange et al (F. F. Lange, B. I. Davis and I. A. Aksay, J. Am. Ceram. Soc. 66 (6), p.398, 1983) demonstrated that dry powder routes to powder consolidation of zirconia-alumina systems can produce large agglomerates which result in large crack-like voids due to differential sintering.

One alternative to dry mixing of dissimilar powders such as zirconia and alumina is the aqueous dispersion of colloidal suspensions of zirconia and alumina. Aksay et al reported (I. A. Aksay, F. F. Lange and B. I. Davis, J. Am. Ceram. Soc. 66 (10), p. C190, 1983) uniform dispersion of the two phases in an aqueous medium maintained at pH values of 2.0–3.5. Solid composites prepared from this dispersion were reported to have improved flexural strength. However, from a practical point of view, the method of producing well dispersed zirconia-alumina systems from a low pH aqueous medium will need additional processing steps of (1) separation of the solid from the aqueous medium (by filtration, gravitation or centrifugal settling) and (2) subsequent drying, adding cost to the final product. Moreover, low pH slurries pose the additional problem of corrosion of containers, stainless steel spray dryers, plaster molds, etc. as well as contamination of the ceramic from the corrosion products. Thus the need for zirconia based ceramic articles with improved properties which can be obtained by a simple fabrication process exists in the prior art.

It is an object of the invention to provide improved ceramic articles and tools, and improved methods for preparing ceramic articles and sintering; in which a hard monoclinic phase is well dispersed in a continuous base matrix of tetragonal zirconia, with the dispersed second phase being less than 100 nm in size. In the broader aspects of the method for preparing ceramic articles of the invention, there is provided a method for preparing a ceramic article comprising compacting a particulate material, including a primary oxide and a secondary oxide, where the oxide particles are coated with a combination of a smectite clay and a suitable polymeric material, to form the green blank. The primary oxide is $ZrO_2$. The secondary oxide is selected from the group consisting of MgO, CaO, $Y_2O_3$, $Sc_2O_3$, rare earth oxides and combinations thereof. The polymeric material can be a water soluble polymer (e.g., polyvinyl alcohol, polyethylene glycol, polyethylene oxide, polystyrene sulfonate, polyacrylamide, polyvinyl pyrrolidone, etc.), a hydrophilic colloid (e.g., gelatin) or a water insoluble latex or dispersion (e.g., polymers and interpolymers of styrene, styrene derivatives, alkyl acrylates or alkylmethacrylates and their derivatives, olefins, acrylonitrile, polyurethane and polyester ionomers) or combinations. The polymeric material is combined with a sol containing a smectite clay, preferably a synthetic smectite which is a hydrous sodium lithium magnesium silicate or fluorosilicate with a layered structure. The smectite clay-polymer combination, henceforth referred to as the "binder", is coated on the oxide particles which are compacted into green blanks and subsequently sintered to form the desired ceramic article. The sintered zirconia alloy ceramic article thus produced has a continuous base matrix of tetragonal zirconia in which a hard monoclinic phase is well dispersed with the dispersed second phase being less than 100 nm in size.

SUMMARY OF THE INVENTION

The present invention is a method of producing a ceramic article. The method includes forming an intercalated or exfoliated solution of smectite clay and a polymer selected from polyvinyl alcohols, polyethylene oxides, polystyrene sulfonates, polyacrylamides, polymers of styrene, alkyl acrylates, alkyl methacrylates, olefins, acrylonitriles, polyurethanes and polyester ionomers. The solution is mixed with zirconia stabilized with at least one rare earth oxide element selected from Mg, Ca, Y, Sc and Ce to form a mixture. The mixture is molded into a green part. The green part is sintered to form the ceramic article.

Figure 1:
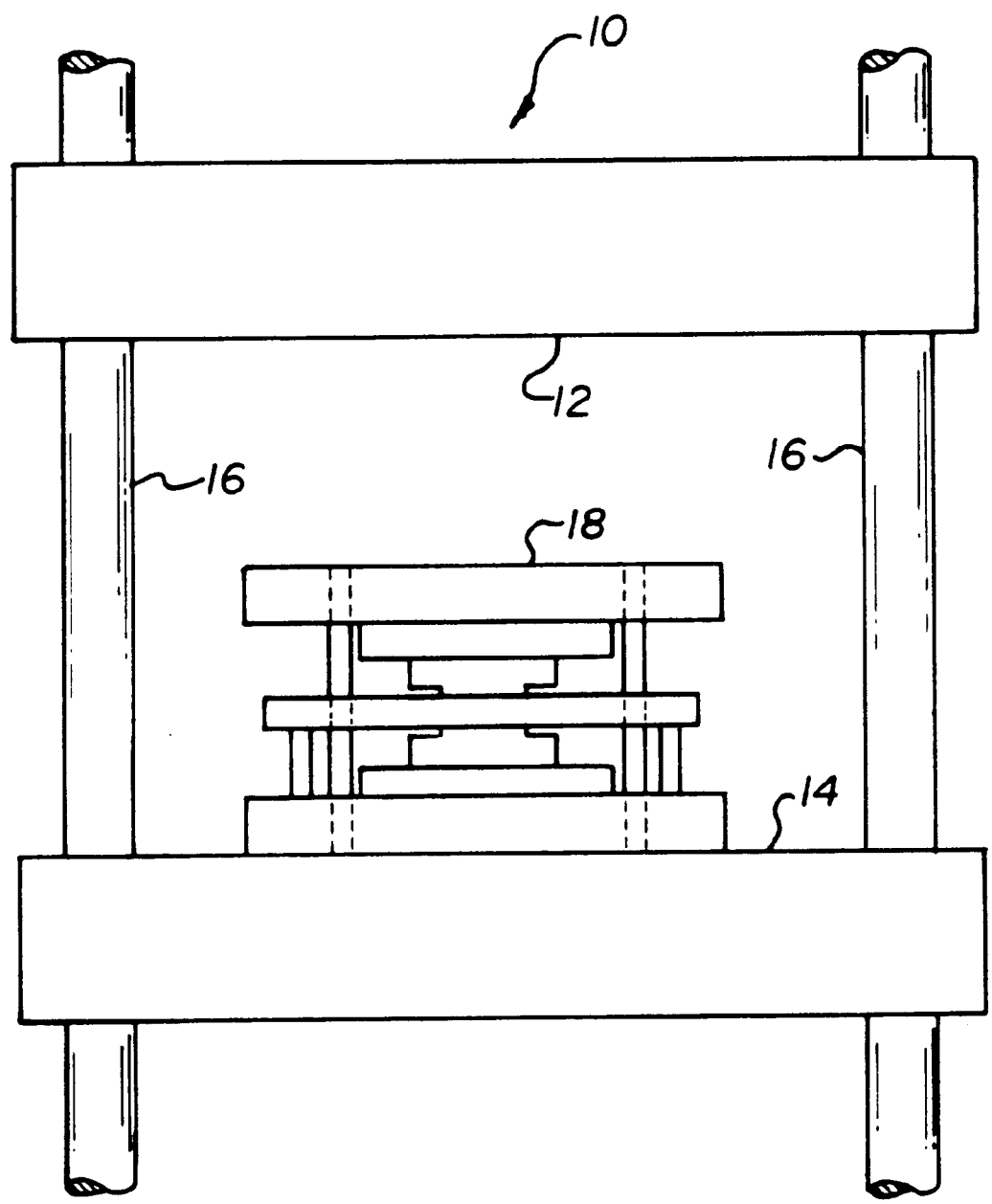
FIG. 1 is a fragmentary, cross-sectional view of a die press useful in the method of the invention.

The above-mentioned and other features and objects of this invention and the manner of attaining them will become more apparent and the invention itself will be better understood by reference to the following description and appended claims.

DESCRIPTION OF THE PREFERRED EMBODIMENTS

The clay material used in this invention is a smectite clay, preferably one closely resembling the natural clay mineral hectorite in both structure and composition. Hectorite is a natural swelling clay which is relatively rare and occurs contaminated with other minerals such as quartz which are difficult and expensive to remove. Synthetic smectite is free from natural impurities, prepared under controlled conditions. One such synthetic smectite is commercially marketed under the tradename Laponite by Laporte Industries, Ltd of UK through its US subsidiary, Southern Clay Products, Inc. It is a layered hydrous magnesium silicate, in which magnesium ions, partially replaced by suitable monovalent ions such as lithium, sodium, potassium and/or vacancies, are octahedrally coordinated to oxygen and/or hydroxyl ions, some of which may be replaced by fluorine ions, forming the central octahedral sheet; such an octahedral sheet is sandwiched between two tetrahedral sheets of silicon ions, tetrahedrally coordinated to oxygen. The primary particle size of such clay platelets are typically ~25 nm in lateral dimension and ~1 nm in thickness.

There are many grades of Laponite such as RD, RDS, J, S, etc. each with unique characteristics and can be used for the present invention. Some of these products contain a polyphosphate peptizing agent such as tetrasodium pyrophosphate for rapid dispersion capability; alternatively, a suitable peptizer can be incorporated into Laponite later on for the same purpose. A typical chemical analysis of Laponite RDS and its physical properties, as per Laponite Product Bulletin, are provided below.

TABLE 1

Typical Chemical Analysis

| Component | Weight % |
|---|---|
| $SiO_2$ | 54.5 |
| MgO | 26.0 |
| $Li_2O$ | 0.8 |
| $Na_2O$ | 5.6 |
| $P_2O_5$ | 4.1 |
| Loss on ignition | 8.0 |

TABLE 2

Typical Physical Properties

| Appearance | White Powder |
|---|---|
| Bulk density | 1000 kg/m$^3$ |
| Surface Area | 330 m$^2$/g |
| pH (2% suspension) | 9.7 |
| Sieve analysis, | 98% <250 m |
| Moisture content | 10% |

Laponite separates into its primary particles (platelets of lateral dimension of ~25 nm and a thickness of ~1 nm) in deionized aqueous dispersions, commonly referred to as "sols." Typical concentration of Laponite in a sol can be 0.1% through 20%. During dispersion in deionized water an electrical double layer forms around the clay platelets resulting in repulsion between them and no structure build up. However, in a formula containing electrolytes introduced from tap water or other ingredients, the double layer can be reduced resulting in attraction between the platelets forming a "house of cards" structure.

The dispersion of clay particles in a polymer matrix can generally result in the following three types of configuration, as discussed by Lan et al (T. Lan, P. D. Kaviratna and T. J. Pinnavia, Chem. Mater.7, 2144(1995)). (1) Unintercalated clay layers in a face-to-face aggregation, macroscopically segregated from the polymer. (2) Intercalated clay of definite structure formed by the insertion of one or more molecular layers of polymer into the clay host galleries. (3) Exfoliated clay where singular clay platelets are dispersed in a continuous polymer matrix. The latter two arrangements of the clay in the polymer provide the maximum surface area per unit weight of clay and are most suitable for the present invention.

In the ceramic industry, powders are often compounded with polymers such as polyethylene glycol, polyvinyl alcohol, gelatin, etc., prior to compacting. The polymer helps in the compacting process (e.g., isostatic pressing, injection molding, etc.) by imparting necessary physical characteristics to the powder (e.g., improving its viscosity, coefficient of friction, etc.). The polymer also increases the green strength of the blanks compacted out of these powders and helps in their handling. Typically, the ceramic powder is coated with the polymer by ball milling or spraying or other suitable processes and subsequently dried. After compacting, the polymer is burnt off from the ceramic article during the heating cycle.

According to the present invention, smectite clay is incorporated into these polymers, before compounding with the zirconia ceramic powder. As per the information provided by U.S. Pat. No. 5,552,469 and co-pending applications U.S. Ser. No. 08/937,685 and 08/940,860, incorporated herein by reference, a number of such polymers (e.g., polyvinyl alcohol, polyvinyl pyrrolidone, polyethylene oxide, polystyrene sulfonate, gelatin, etc.) can intercalate inside and/or exfoliate smectite clay, forming a stable and uniform clay-polymer combination.

In the present invention, the clay-polymer combination or binder is coated and dried onto the zirconia particles, thus bringing the clay in close contact with individual zirconia particles. When green ceramic articles formed out of these zirconia particles are subjected to the sintering process, the smectite clay from the binder interacts with the zirconia forming a monoclinic zirconia phase, as per the teachings of U.S. Pat. Nos. 5,804,131 and 5,798,308. However, these applications teach that one may make a core-shell type ceramic structure, the core being tetragonal phase and the shell being monoclinic phase.

In the present invention, the size of the reacting clay is limited to ~25 nm laterally, the reaction product, in this case monoclinic zirconia, has a size less than 100 nm. Thus a fine dispersion of monoclinic zirconia, with a lateral dimension of less than 100 nm, is uniformly distributed in the tetragonal zirconia matrix. The strengthening of the composite material arises from two sources: (1) incorporation of the harder monoclinic phase in the tetragonal matrix and (2) incorporation of localized compressive stress, due to the tetragonal-to-monoclinic phase transformation in zirconia, at the points of transformation i.e., the points where the smectite clay interacts with the zirconia particle. These pockets of compressive stress resist crack propagation in the composite and, thus, improve its mechanical property.

Use of clay in room temperature injection molding of zirconia-based articles is taught in U.S. Pat. Nos. 5,723,393; 5,730,929 and 5,726,110 incorporated herein by reference. The distinctive thixotropic rheology of clay in water, whereby a "house of cards" structure is formed by the clay platelets, is utilized in these teachings to obtain the acceptable properties for room temperature injection molding. However, the zirconia-based ceramic articles as per the teachings of U.S. Pat. Nos. 5,723,393; 5,730,929 and 5,726,110 are essentially tetragonal, and thus from the zirconia articles of the present invention. It is hypothesized that when the clay platelets form the "house of cards" structure to attain the proper rheology necessary for the practice of U.S. Pat. Nos. 5,723,393; 5,730,929 and 5,726,110, the clay platelets are primarily arranged in an entangled network and do not come in contact with the zirconia surface. Thus there is no tetragonal-to-monoclinic phase transformation. However, according to the present invention, intercalated/exfoliated clay platelets distribute uniformly around the zirconia particulates and bring about the tetragonal-to-monoclinic phase transformation much more efficiently, creating a stronger ceramic article.

Intercalation and exfoliation of clay can be conveniently monitored by measuring the basal (001) spacing of the clay platelets using X-ray diffraction technique, as illustrated by Gianellis et al. in U.S. Pat. No. 5,554,670, incorporated herein by reference. With intercalation of a polymer in the clay gallery, an increase in the basal spacing of the clay is observed. When completely exfoliated, the diffraction peaks disappear since the crystallographic order is lost.

For the current invention the polymeric binder can be a water soluble polymer (e.g., polyvinyl alcohol, polyethylene oxide, polystyrene sulfonate, polyacrylamide), a hydrophilic colloid (e.g., gelatin) or a water insoluble latex (e.g., polymers and interpolymers of styrene, styrene derivatives, alkyl acrylates or alkyl methacrylates and their derivatives, olefins, acrylonitrile, polyurethane and polyester ionomers).

The present invention is a ceramic article and method for preparing the same comprising compacting a particulate material including a primary oxide and a secondary oxide generating a mass of sintered particles having a continuous tetragonal crystalline phase having dispersed therein a monoclinic phase with a size of less than 100 nm. The primary oxide is $ZrO_2$. The secondary oxide is selected from the group consisting of MgO, CaO, $Y_2O_3$, $Sc_2O_3$, rare earth oxides and combinations thereof. The interaction between the primary oxide and the secondary oxide during sintering generates the tetragonal phase. The monoclinic phase is generated by incorporating in a controlled way a smectite clay, preferably a synthetic nanoparticulate smectite combined with a suitable polymer, into the mixture of the aforesaid oxide particles. During sintering the smectite clay interacts with the oxide, at the point of contact between the clay and the oxide, to form the monoclinic phase. Because of the nanoparticulate nature of the clay, the resultant monoclinic phase also has the dimension of nanometers. The sintered zirconia alloy ceramic thus has a continuous phase of the tough tetragonal crystalline structure with very finely dispersed hard monoclinic phase. Such a unique morphology imparts improved mechanical properties to the sintered ceramic article.

Alternatively, a zirconia based composite can be prepared wherein the zirconia alloy has essentially a tetragonal crystal structure having finely dispersed monoclinic phase, prepared in a manner described hereinbefore in accordance with the present invention. Examples of zirconia based composites include, but are not limited to, zirconia-alumina, zirconia-silicon carbide, zirconia-zirconium diboride, and the like.

In the methods of the invention, particulate zirconia alloy is coated with a smectite clay-polymer combination and compacted into a "green" article which is subsequently sintered. The resulting ceramic article of the invention has a fine dispersion of monoclinic zirconia, with a lateral dimension of less than 100 nm, uniformly distributed in the base matrix of tetragonal zirconia.

The methods of the invention utilize particulate alloys of $ZrO_2$ and additional oxide selected from: MgO, CaO, $Y_2O_3$, $Sc_2O_3$ and $Ce_2O_3$ and other rare earth oxides (also referred to herein as "Mg—Ca—Y—Sc—rare earth oxides"). Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having about 1 to about 15 mole percent Mg—Ca—Y—Sc—rare earth oxide exhibit a tetragonal structure. Preferred oxides for alloying with zirconia are $Y_2O_3$, MgO, CaO, $Ce_2O_3$ and combinations of these oxides. For specific preferred amounts of secondary oxides U.S. Pat. No. 5,672,302, incorporated by reference herein, provides the proper concentration ranges. It is preferred that the zirconia powder have a high purity, greater than about 99.9 percent. The preparation of zirconia alloys is well known to those skilled in the art and zirconia alloys are available commercially. For example, particulate zirconia alloy having 2 to 5, preferably 3 mole percent $Y_2O_3$ is marketed by several vendors such as HANWHA Advanced Ceramics (as HWA-ZY 3P), Zirconia Sales Corporation of America (as HSY-3SD), and TOSHO Corporation (as 3YB).

The grain and agglomerate sizes and distributions, moisture content and use of binder in the zirconia alloy are selected in a manner well known to those skilled in the art. "Grain" is defined as an individual crystal, which may be within a particle, having a spatial orientation that is distinct from that of adjacent grains. "Agglomerate" is defined as an aggregation of individual particles,each of which may comprise multiple grains. An example of useful grain and agglomeration sizes and distributions for a particular embodiment of the invention is the following. The grain size is from about 0.1 micrometers to about 0.6 micrometers. The average grain size is 0.3 micrometers. The distribution of grain size is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14$m^2$/gram. Agglomerate size is from about 30 to about 60 micrometers and average agglomerate size is 40–60 micrometers. Moisture content of the powder is about 0.2 to 1.0 percent by volume of blank and is preferably 0.5 percent.

The zirconia alloy powder and its composites are compounded with a smectite clay-polymer combination or binder before compacting. The smectite clay-polymer combination is prepared preferably by mixing a sol of smectite clay with a solution or dispersion of an appropriate polymer. Alternatively the clay can be directly dispersesd in a dry or liquid form of the polymer.

The clay material used for the sol is a smectite clay, preferably one closely resembling the natural clay mineral hectorite in both structure and composition. Synthetic smectite, which is free from natural impurities and prepared under controlled conditions with nanometers dimension, is preferred for use in this invention. One such synthetic smectite is commercially marketed under the tradename Laponite by Laporte Industries, Ltd of UK through its US subsidiary, Southern Clay Products, Inc. The primary particle size of such clay platelets are typically ~25 nm in lateral dimension and ~1 nm in thickness.

There are many grades of Laponite such as RD, RDS, J, S, etc. each with unique characteristics and can be used for the present invention. Some of these products contain a polyphosphate peptizing agent such as tetrasodium pyrophosphate for rapid dispersion capability;alternatively, a suitable peptizer can be incorporated into Laponite later on for the same purpose The smectite clay sol is prepared by dispersing Laponite in deionized aqueous medium where Laponite separates into its primary particles, which are platelets of lateral dimension of ~25 nm and a thickness of ~1 nm, forming a transparent dispersion. Typical concentration of Laponite in a sol can be 0.1% through 20%.

Such a smectite sol is mixed with the appropriate polymer to form the binder for the zirconia powder. This polymer can be a water soluble polymer (e.g., polyvinyl alcohol, polyethylene glycol, polyethylene oxide, polystyrene sulfonate, polyacrylamide, polyvinyl pyrrolidone, etc.), a hydrophilic colloid (e.g., gelatin) or a water insoluble latex or dispersion (e.g., polymers and interpolymers of styrene, styrene derivatives, alkyl acrylates or alkylmethacrylates and their derivatives, olefins, acrylonitrile, polyurethane and polyester ionomers) or combinations. It is preferred that the selected polymer is capable of intercalating inside and/or exfoliating the smectite clay, as taught in copending applications U.S. Ser. No. 08/937,685 and 08/940,860. Preferred choice of polymer will include polyvinyl alcohol, polyethylene glycol, polyethylene oxide, polyvinyl pyrrolidone, etc. The smectite clay:polymer ratio in the binder can be chosen according to the specific application and can vary from 0.1:99.9 to 95:5 but preferably from 1:99 to 30:70. The binder is added to and mixed with the zirconia powder, for example by spray drying or ball milling, prior to placement of the powder in a compacting device. The binder:zirconia ratio can be chosen according to the specific application. The clay:zirconia ratio can be adjusted between 3:97 and 25:75 but preferably between 3:97 and 15:85.

Specific examples of alloys useful in the methods of the invention include: tetragonal structure zirconia alloys having from about 2 to about 5 mole percent $Y_2O_3$, or more preferably about 3 mole percent $Y_2O_3$. Examples of tetragonal structure zirconia alloys useful in the methods of the invention are disclosed in U.S. Pat. No. 5,336,282 which is hereby incorporated herein by reference. In the above U.S. patent, the alloy is selected so as to provide a "net shape" ceramic article as that term is defined therein: a ceramic article that is dimensionally true after sintering and therefore does not necessitate further machining prior to use in its intended working environment. In other words, the amount of shrink-age during sintering is predictable, producing a ceramic part that conforms to a predetermined shape and dimensions. The particulate zirconia alloy is substantially uniform. Purity of the alloy is well controlled at 99.9 to 99.99 percent, that is, impurities are no more than about 0.1 to 0.01 percent. Grain size is from about 0.1 micrometers to about 0.6 micrometers. Average grain size is 0.3 micrometers. The distribution of grain size is: 10 percent less than 0.1 micrometers, 50 percent less than 0.3 micrometers, and 90 percent less than 0.6 micrometers. Surface area of each individual grain ranges from about 10 to about 15 $m^2$/gram and is preferably 14 $m^2$/gram. Agglomerate size is from about 30 to about 60 micrometers. Average agglomerate size is 50 micrometers. Moisture content of the powder is about 0.2 to 1.0 percent by volume of blank and is preferably 0.5 percent.

In addition to being compacted, the zirconia alloy powder compact is heated to a temperature range at which sintering will occur; sintered, that is, maintained at that temperature range for a period of time; and then cooled. Compaction and sintering are generally discussed herein as two consecutive operations, however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank". A blank is at least partially compacted and is either unsintered or not fully sintered. Completion of compacting and sintering provides the finished ceramic article, which has a fine dispersion of a monoclinic phase, less than 100 nm in lateral dimension, uniformly distributed in a continuous base matrix of tetragonal phase.

The particular method of compacting the zirconia alloy powder is not critical. In a preferred embodiment of the invention, the particulate zirconia alloy is cold compacted to provide an unsintered blank, which is also referred to herein as a "green preform". The terms "cold compaction" and the like refer to compression of the particulate alloy at a temperature below glass transition or decomposition temperature of the binder. The green preform can be produced by such methods as cold uniaxial pressing, cold isostatic pressing, injection molding or cold extrusion. The alloy powder is preferably subjected to uniform compacting forces in order to provide a blank which has a uniform density.

Figure 2:
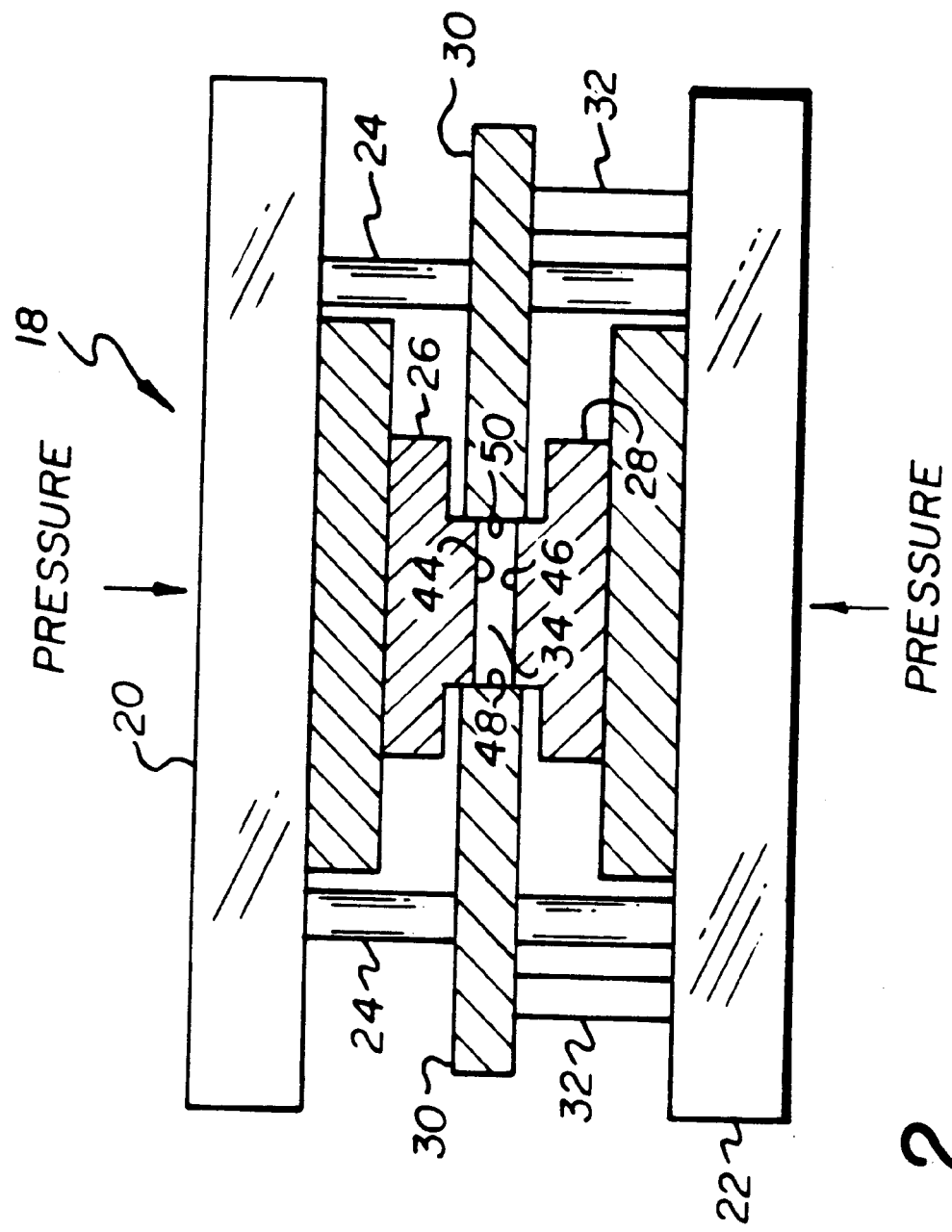
FIG. 2 is an enlarged cross-sectional view of the mold and die assembly of the die press of FIG. 1.

A preferred compacting device that achieves uniform compacting forces is a floating mold die press 10, as disclosed in U.S. Pat. No. 5,336,282 and as shown in FIG. 1. Die press comprises fixed platform 12 and movable platform 14 mounted on supports 16. Movable platform 14 is driven by hydraulic means (not illustrated) and supports mold and die assembly 18. FIG. 2 further illustrates assembly 18 as comprising plates 20,22, which are slideably mounted on rods 24. Die sets 26,28 are mounted respectively on plates 20,22. Center platen 30 is mounted by spacer plates 32 on plate 22, and together with die sets 26, 28 defines cavity 34 there between. The zirconia alloy is compacted by first placing in cavity 34, a selected amount of zirconia alloy powder mixed with binder. Platform 22 is then moved in the direction illustrated by the direction arrow in FIG. 2, forcing plate 22 to ward plate 20 and thereby compacting the powder to form the blank or green preform. The compaction forces exerted on the powder are substantially uniform because plates 20,22 are each free to move on rods 24, resulting in a blank having a uniform density.

Mold and die assembly 18 should have dimensionally close tolerances in order to minimize or eliminate the need for post-sintering machining of working surfaces of the finished ceramic article. For example, compaction surfaces 44,46 of respective die sets 26,28 can be parallel with a maximum design deviation from parallel of plus or minus 0.00005 inches. Compaction surfaces 48,50 of center platen 30 can be perpendicular to surfaces 44,46 and have a maximum design deviation from perpendicularity of plus or minus 0.00005 inches. The fill ratio should be established to produce a blank of a desired dimension, which after sintering will result in a ceramic of the final desired dimension. "Fill ratio" is the ratio of the height of cavity 34 taken along the axis of movement of platform 14 with platform 14 in its initial, lowest position, to the height of the green part formed in cavity 34 taken along the axis of compaction of the powder in cavity 34. In other words, such height of the green preform also equals the distance between compaction surfaces 44,46 of mold and die assembly 18 at the final end-of-compacting position.

It is preferred that the green density be between about 40 and about 65 percent of the tetragonal structure final sintered density, or more preferably be about 60 percent of the tetragonal structure final sintered density. In an example from a particular embodiment of the invention, an article produced from a zirconia alloy having 3 mole percent $Y_2O_3$ has a final sintered density of 6.08 grams/cm$^3$, a range of preferred green densities of from about 2.5 to about 4.0 grams/cm$^3$, and a more preferred green density of about 3.65 grams/cm$^3$.

For a particular powder distribution, the green density is largely dependent upon the compaction pressure and the fill ratio. Preferred compaction pressures in the methods of the invention are about 10,000–30,000 psi (69–207 MPa). A more preferred compaction pressure is about 15,000 psi (about 100 MPa). The fill ratio is maintained at from about 2.5 to 1 to about 3.5 to 1. A preferred fill ratio is about 3.0 to 1. Compaction time can be readily determined by the operator depending upon the compaction pressure selected. Compaction time, for example, can be in the range of from about 60 seconds to about 10 seconds for compaction pressures in the range of about 12,000 psi to about 18,000 psi, respectively. For a compaction pressure of 15,000 (100 MPa), the compaction time can be 30 seconds. It is well known that the compaction pressure and time selected by the operator can be dependent upon the size of the finished part 108. Generally, as the part size increases, compaction pressure or compaction time or both is increased.

It is preferred that the sintering result in a ceramic article 108 having a "full" or nearly theoretical density, and it is more preferred that the density of the ceramic article be from about 99.5 to about 99.9 percent of theoretical density. In an example from a particular embodiment of the invention, an article produced from a zirconia alloy having 3 mole percent $Y_2O_3$ has a final sintered density of 6.05–6.08 grams/cm$^3$ with a grain size of less than 1 micrometer and preferably less than 0.5 micrometers.

Sintering is conducted in air or other oxygen containing atmosphere. The methods of the invention are not limited to any particular sintering pressure and temperature conditions. Sintering can be performed at atmospheric pressure or alternatively a higher pressure can be used during all or part of the sintering to reduce porosity. The sintering is continued for a sufficient time period for the article being sintered to reach a thermodynamic equilibrium composition and structure. An example of a useful range of elevated sintering pressures is from about 69 MPa to about 207 MPa, or more preferably about 100–103 MPa. An example of a useful range of sintering temperatures is from about 1400° C. to about 1600° C., or more preferably about 1500° C. An example of a useful range of sintering times is from about 1 hour to about 3 hours or more preferably about 2 hours. In a particular embodiment of the methods of the invention, the sintering peak temperature is 1500° C. and that temperature is maintained for about 2 hours.

It is preferred that the sintered blank be slowly heated to sintering temperature and slowly cooled so as to avoid undesirable dimensional changes and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

The methods of the invention are applicable to the production of a variety of articles, particularly cutting tools and abrasion and wear resistant parts, in that many tools have a longer service life and improved performance if the tool material comprises a hard phase uniformly dispersed in a tough continuous matrix. Examples of tools include slitter knives, punches and dies; for cloth, cardboard, metal, polymeric materials and paper coated with abrasive material such as silver halides and the like. Typical hardness for monoclinic zirconia phase is 15–17 GPa. This contrasts with the hardness of 12–13 GPa typical of tetragonal zirconia. Thus, an article with uniformly distributed monoclinic phase in a tetragonal phase matrix can have a hardness in the range of 14 to 16 GPa along with high fracture toughness. The configuration of articles prepared by the methods of the invention is limited by the requirements of cold compaction and sintering, for example, mold size and shape and sintering oven size and shape,but is not believed to be subject to other limitations. The methods and articles of the invention are not limited to discrete ceramic items, thus the terms blank and ceramic article and the like, used herein can also refer to portions of larger items.

The following Working Examples and Comparative Examples are presented for a further understanding of the invention. It is understood that there are other variations and modifications which can be effected by a person of ordinary skill in the art without departing from the scope of the invention.

WORKING EXAMPLE (SAMPLE 1)

Sample 1. Yttria stabilized zirconia powder was ball-milled with a binder which was a combination of clay and polyethylene oxide in a 30:70 weight ratio. The clay in this combination is either intercalated or exfoliated. The clay:yttria stabilized zirconia ratio was maintained at 10:90. Subsequent to ball milling, the dry powder was compacted and sintered at 1500° C.

Comparative Examples (Sample 2–4).

Sample 2 was prepared similar to sample 1, except the clay was not combined with any polyethylene oxide, and hence was not intecalated or exfoliated.

Sample 3. Yttria stabilized zirconia powder was ball-milled with a binder which was acombination of clay and polyethylene oxide in a 30:70 weight ratio. The clay in this combination was either intercalated or exfoliated. The clay:yttria stabilized zirconia ratio was maintained at 2:98. Subsequent to ball milling, the dry powder was compacted and sintered at 1500° C.

Sample 4 was prepared similar to sample 3, except the clay was not combined with any polyethylene oxide, and hence was not intecalated or exfoliated.

All samples were analyzed by x-ray diffraction technique, and the results are presented in Table 3. All samples were found to contain tetragonal $ZrO_2$ as the major phase. Samples 1 and 2 also contained a minor phase of monclinic zirconia.

The $ZrO_2$ phase ratio was determined by taking the sum of the areas of the (-111) plus (111) monoclinic peaks and dividing it by the sum of the areas of (-111) plus (111) monoclinic peaks plus the area of the (111) tetragonal peak, then multiplying by 100 to put it in terms of percent monoclinic $ZrO_2$.

The x-ray diffraction result are tabulated in Table 3.

TABLE 3

| Sample ID | tetragonal $ZrO_2$ | monoclinic $ZrO_2$ | Addition Unknown Phase(s) | % Monoclinic $ZrO_2$ |
|---|---|---|---|---|
| 1 | Major | Minor | Trace | 9.5 |
| 2 | Major | Minor | — | 2.1 |
| 3 | Major | None Detected | — | — |
| 4 | Major | None Detected | — | — |

It is clear from these results that monoclinic phase does not form if the clay content is less than 2% whether the clay particles are intercalated/exfoliated or not (Sample 3 and 4). It is also clear from these results that intercalation/exfoliation of clay in the binder has a beneficial effect on the resultant structure of the ceramic articles. Sample 1 prepared according to the present invention containing clay in the intercalated/exfoliated state in combination with a suitable polymer resulted in 4.5 times more monoclinic phase distributed uniformly in the tetragonal matrix than Sample 2 which contained the same amount of clay but not in the intercalated/exfoliated state. Intercalated/exfoliated clay in polymer has a much greater possibility of uniformly contacting the zirconia particles which eventually results in uniformly distributed monoclinic phase (9.5% by volume in Sample 1). However, if the clay particles are not intercalated/exfoliated, they do not contact the zirconia particles effectively and the formation of monoclinic phase is not uniform as indicated by lower volume fraction of the monoclinic phase present (2.1% in Sample 2).

The invention has been described in detail with particular reference to certain preferred embodiments thereof, but it will be understood that variations and modifications can be effected within the spirit and scope of the invention.

What is claimed is:

1. A method of producing a ceramic article comprising:

forming an intercalated or exfoliated solution of smectite clay and a polymer selected from the group consisting of polyvinyl alcohols, polyethylene oxides, polystyrene sulfonates, polyacrylamides, polymers of styrene, alkyl acrylate polymers, alkyl methacrylate, polymers, olefin polymers, polyurethanes and polyester ionomers;

mixing the intercalated or exfoliated solution with zirconia stabilized with at least one rare earth oxide element selected from the group consisting of Mg, Ca, Y, Sc and Ce to form a mixture;

molding the mixture into a green part;

sintering the green part to form the ceramic article.

2. The method of of claim 1 wherein a rare earth oxide:stabilized zirconia molar ratio is from 1:99 to 15:85.

3. The method of of claim 1 wherein the rare earth oxide comprises yttria, at a yttria:stabilized zirconia molar ratio of from 2:98 to 5:95.

4. The method of of claim 1 wherein the green part comprises a density between about 40 and 65 percent of a final sintered density.

5. The method of of claim 1 wherein a ceramic article has a density of about 6.05 to 6.08 grams/cm$^3$.

6. The method of of claim 1 wherein sintering is at a temperature of from 1400°C to about 1600°C.

7. The method of of claim 1 wherein mixing is by spray drying.

8. The method of of claim 1 wherein mixing is by ball milling.

* * * * *